Oct. 24, 1961    F. W. COPLESTON ET AL    3,005,902
ELECTRIC ARC WELDING
Filed April 13, 1959    2 Sheets-Sheet 1
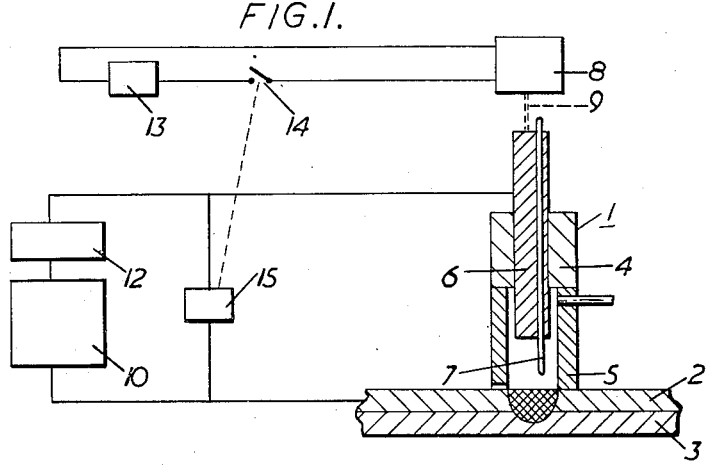
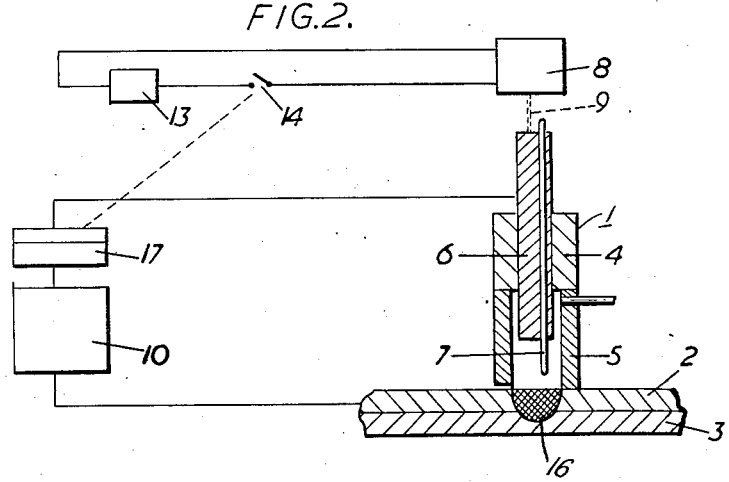
Inventors
FRANCIS WILLIAM COPLESTON
JOHN JAMES ORTON
By
Aaron R. Townshend  Attorney

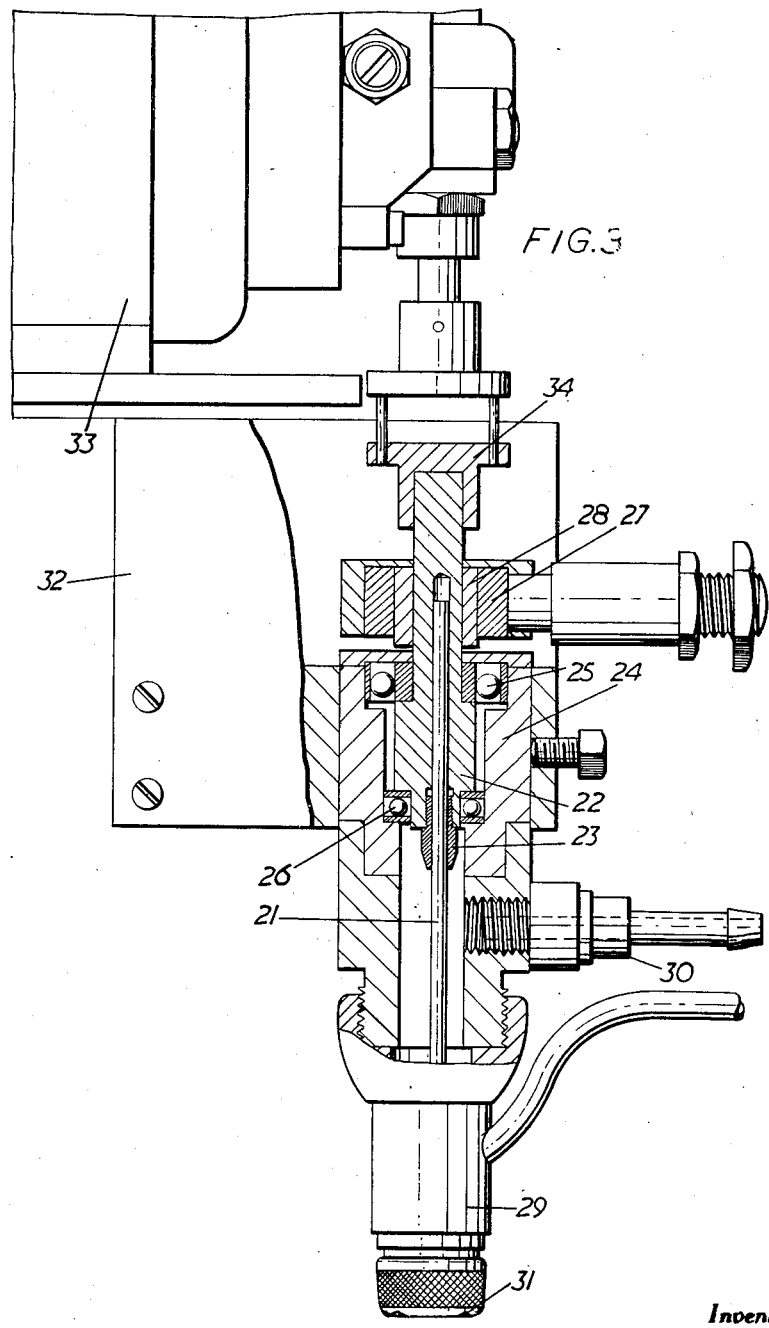

3,005,902
ELECTRIC ARC WELDING
Francis William Copleston, Finchley, and John James Orton, Stanmore, England, assignors to The British Oxygen Company Limited, a British company
Filed Apr. 13, 1959, Ser. No. 806,008
Claims priority, application Great Britain Apr. 21, 1958
7 Claims. (Cl. 219—127)

This invention relates to electric arc welding, and more particularly to methods and apparatus for producing, with the aid of a substantially non-consumable electrode, spot welds joining overlapped metal members.

In such methods of welding it is the practice to mount the non-consumable electrode in a welding head which is maintained stationary with respect to the members being welded during the welding cycle, which is of limited duration. The non-consumable electrode is surrounded by, and spaced back from the mouth of, a nozzle which engages one surface of one of the members during welding and encloses a limited area of this surface. Deleterious gas is purged from the space within the nozzle by supplying shielding gas to the nozzle, and this action can be considered to constitute the beginning of the welding cycle. An electric arc is established between the tip of the non-consumable electrode and the limited area to form a weld pool extending from this surface through the interface and into the other member. After the welding current has flowed at its welding value for a predetermined period, herein called the main welding current period, the current decay portion of the welding cycle begins, the welding current then being reduced progressively to zero. At the termination of the welding cycle the welding head is moved to the position of the next weld whereupon a further welding cycle may be initiated.

It is an object of the present invention to provide a method and apparatus for producing improved spot welds.

According to the present invention, in a method of producing a spot weld joining two overlapped metal members in which an electric arc is struck for a limited duration between one of the members and a substantially non-consumable electrode, the electric arc is caused to move laterally over the weld pool during the welding cycle.

According to one feature of the present invention, the arc is caused to move laterally over the weld pool during the passage of the main welding current. This tends to increase the area of interface fusion between the members and so result in a weld of increased strength.

According to another feature of the present invention, the arc is caused to move laterally over the weld pool during the current decay portion of the welding cycle. This feature, which may be used in conjunction with the feature set out in the previous paragraph or may be used alone, tends to alter the mode of solidification of the surface of the weld and so tends to give freedom from the defects normally associated with welds in mild steel, heat resisting steels etcetera.

The arc may be deflected to move over the weld pool by a limited movement of the electrode tip. This limited movement is conveniently a rotation about the axis of the electrode support but other movements, for example a translatory movement across the weld pool may be adopted.

According to the present invention, electric arc welding apparatus comprises a torch body, a substantially non-consumable electrode, a support within the torch body for the said electrode, the support being rotatably mounted in the torch body about an axis which extends into the weld pool when the apparatus is in use, and the electrode tip being spaced from the axis of rotation of the support, a nozzle mounted on the torch body and surrounding the tip of the said electrode and adapted to engage the surface of a workpiece and to enclose a limited area thereof to which the welding arc is established and to space the tip of the said electrode from this surface, means adapted to rotate the support with respect to the torch body to effect rotational movement of the tip of the said electrode within the nozzle, and a gas supply connection through which gas can be supplied to purge the nozzle of deleterious gases.

The invention will now be described by way of example with reference to the three figures of the accompanying drawings in which:

FIG. 1 shows one mode of connection of one diagrammatic construction of arc torch, FIG. 2 shows another mode of connection of the same diagrammatic construction of arc torch, and FIGURE 3 shows a part-sectional elevation of another construction of arc torch.

In FIGURE 1 and 2, an arc torch 1 is shown in position for spot welding together two overlapped plates 2 and 3. The arc torch comprises a torch body 4, a generally cylindrical nozzle 5 mounted on the body 4, and rotatable electrode support 6 within the body with its axis coaxial with the nozzle. An electrode rod 7 of so-called non-consumable material such as tungsten is carried by the electrode support 6 with the electrode tip suitably spaced from the mouth of the nozzle 5 to predetermine the arc length, and with the electrode rod 7 parallel to and spaced from the axis of the support 6.

Rotation of the electrode support 6 in the torch body 4 causes the electrode tip to move in a circle about the support axis, and this rotation is effected by actuating means acting through a transmission 9, which may be a flexible drive to the arc torch. The actuating means is an eletctric motor 8 in this particular case, and this electric motor may be energised during the passage of the main welding current, during the current decay period only of the welding cycle, or during the whole of the welding cycle.

A power source 10 for supplying alternating or direct welding current to the arc torch is connected between the electrode 7 and the plate 2, and the output of this power source is controlled by timing means 12 arranged to interrupt the main welding current at a predetermined time after the establishment of the welding arc. The electric motor is energised from power supply 13 by way of a pair of contacts 14.

With the mode of connection shown in FIGURE 1, a voltage relay 15 connected between the electrode 7 and the plate 2 is arranged to be energised in response to the occurrence of a predetermined arc voltage between these two parts. Energisation of voltage relay 15 closes the pair of contacts 14 to complete the power supply circuit for the electric motor 8. In this case the electric motor is energised to rotate the electrode tip during the passage of the main welding current and during the current decay period until the arc is extinguished. The movement of the electrode tip during the passage of the main welding current tends to enlarge the area of the weld nugget 16 at the interface of the plates 2 and 3 and therefore tends to strengthen the spot weld.

In the slightly modified connections for the arc torch shown in FIGURE 2, a pair of contacts 14 in the power supply circuit for the electric motor are arranged to be closed at the end of the main welding current portion of the welding cycle by switching means incorporated in timing means 17. The timing means 17 used in this connection incorporates a crater filling control which progressively introduces electrical resistance into the welding power source control circuit to reduce the welding current, in four steps for example, from the main welding current value to zero during the current decay portion of the welding cycle. Such arrangements are commonly provided where it desired to reduce or prevent weld cratering. The current decay portion of the welding cycle may be of one to three seconds duration depending inter alia on the thickness and the material of the plates being welded. The main welding current portion of the welding cycle will generally be of the order of one second. With the connection shown in FIGURE 2, the electrode 7 is moved during the current decay period of the welding cycle. By altering the mode of solidification of the surface of the weld pool in this way we have found that we can avoid defects normally associated with spot welds made with the non-consumable electrode arc welding process in mild steels and heat resisting steels.

Referring now to the construction of arc torch shown in FIGURE 3, a non-consumable electrode 21 is retained in an electrode support 22 by a collet 23. This electrode holder is rotatably and coaxially carried in a torch body 24 by two sets of ball bearings 25 and 26, the electrode 21 being spaced to one side of the torch axis, and welding current is fed to this electrode support by carbon brushes 27 and a slip ring 28. A water cooled nozzle 29 is coaxially mounted on the torch body 24. Shielding gas such as argon may be fed to purge the nozzle 29 of deleterious gases by way of a connection 30. Notches 31 at the mouth of the nozzle 29 allow deleterious gases to flow from the nozzle when the mouth of the nozzle is pressed against a plate to be welded.

The arc torch may be supported in use by a bracket 32 to which the torch body 24 is secured. This bracket also supports an electric motor 33 which is connected to the electrode support 22 by a coupling 34. If desired, the electric motor 33 could be located at a remote position, and a flexible drive from this motor could be connected to the coupling 34.

In operation, the mouth of the nozzle 29 is pressed against one of the plates to be welded to enclose a limited area of this surface, shielding gas such as argon is supplied to purge the nozzle of deleterious gas, and an electric arc is established between the tip of the electrode 21 and the plate, cooling water being passed through the nozzle as necessary. Depending on the type of weld improvement required as explained above, the electrode support 22 and hence the tip of the electrode 21 is rotated during the appropriate part of the welding cycle, the nozzle 29 remaining in stationary contact with the plate until the end of the welding cycle.

What we claim is:

1. In the known method of producing a spot weld joining two overlapped metal members by enlosing a limited area of one surface of one of the metal members with a nozzle which surrounds a substantially non-consumable electrode that is spaced from the mouth of the nozzle, supplying a shielding gas to purge the space within the nozzle of deleterious gas, establishing an electric arc between the tip of the said electrode and the limited area to form a weld pool extending from the said one surface through the interface between the metal members and into the other metal member, and maintaining the nozzle in stationary contact with the said one surface until the welding cycle has ended, said electric arc having a main welding current portion and a current decay portion, the improvement which comprises moving the tip of the said electrode laterally over the weld pool during the passage of the main welding current, thereby increasing the area of interface fusion between the members.

2. In the known method of producing a spot weld joining two overlapped metal members by enclosing a limited area of one surface of one of the metal members with a nozzle which surrounds a substantially non-consumable electrode that is spaced from the mouth of the nozzle, supplying a shielding gas to purge the space within the nozzle of deleterious gas, establishing an electric arc between the tip of the said electrode and the limited area to form a weld pool extending from the said one surface through the interface between the metal members and into the other metal member, and maintaining the nozzle in stationary contact with the said one surface until the welding cycle has ended, said electric arc having a main welding current portion and a current decay portion, the improvement which comprises moving the tip of the said electrode laterally over the weld pool during the current decay portion of the welding cycle thereby producing a superior mode of solidification of the surface of the weld pool.

3. Electric arc welding apparatus comprising a torch body, a substantially non-consumable electrode, a support within the torch body for the said electrode, the support being rotatably mounted in the torch body about an axis which extends into the weld pool when the apparatus is in use, and the electrode tip being spaced from the axis of rotation of the support, a nozzle mounted on the torch body and surrounding the tip of the said electrode and adapted to engage the surface of a workpiece and to enclose a limited area thereof to which the welding arc is established and to space the tip of the said electrode from this surface, means adapted to rotate the support with respect to the torch body to effect rotational movement of the tip of the said electrode within the nozzle, and a gas supply connection through which gas can be supplied to purge the nozzle of deleterious gases.

4. Electric arc welding apparatus as claimed in claim 3, and including an electric motor adapted to rotate the support with respect to the torch body, and means for energising the electric motor in response to the flow of welding current to the said electrode.

5. Electric arc welding aparatus as claimed in claim 3, and including an electric motor adapted to rotate the support with respect to the torch body, and means for energising the electric motor in response to the occurrence of a predetermined arc voltage between the said electrode and the workpiece.

6. Electric arc welding apparatus as claimed in claim 3, and including an electric motor adapted to rotate the support with respect to the torch body, a power source for welding current, a timing control arranged to allow welding current to flow during a main welding current portion of the weld cycle and arranged to reduce the welding current progressively during the succeeding current decay portion of the welding cycle, and means responsive to the timing means for energising the electric motor during the current decay portion only of the welding cycle.

7. Electric arc welding apparatus as claimed in claim 6, wherein switching means are provided for progressively reducing the welding current during the welding current decay period by inserting electrical resistance in the welding circuit, and wherein the electric motor is arranged to be energised by the switching means.

References Cited in the file of this patent

UNITED STATES PATENTS

| | | |
|---|---|---|
| 1,552,060 | Kramer | Sept. 1, 1925 |
| 1,667,585 | Chapman | Apr. 24, 1928 |
| 1,792,243 | Richter | Feb. 10, 1931 |
| 2,583,665 | Pilia | Jan. 29, 1952 |
| 2,844,705 | Bowman et al. | July 22, 1958 |
| 2,845,524 | Morley et al. | July 29, 1958 |
| 2,898,444 | Frantz et al. | Aug. 4, 1959 |

FOREIGN PATENTS

| | | |
|---|---|---|
| 404,503 | Great Britain | Jan. 18, 1934 |
| 765,248 | Great Britain | Jan. 9, 1957 |